US011908316B2

(12) United States Patent
Miyazawa et al.

(10) Patent No.: US 11,908,316 B2
(45) Date of Patent: Feb. 20, 2024

(54) WALKING INFORMATION PROVISION SYSTEM

(71) Applicant: TOYOTA JIDOSHA KABUSHIKI KAISHA, Aichi-ken (JP)

(72) Inventors: Tsuyoshi Miyazawa, Miyoshi (JP); Tomoaki Mitsuhashi, Nagakute (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/883,605

(22) Filed: Aug. 9, 2022

(65) Prior Publication Data

US 2023/0062251 A1 Mar. 2, 2023

(30) Foreign Application Priority Data

Aug. 31, 2021 (JP) ................................ 2021-140635

(51) Int. Cl.
*G08G 1/005* (2006.01)
*G08B 6/00* (2006.01)

(52) U.S. Cl.
CPC ............... *G08G 1/005* (2013.01); *G08B 6/00* (2013.01)

(58) Field of Classification Search
USPC ...... 340/944, 691.3, 691.6, 692, 685, 686.6, 340/693.4, 825.19, 5.32, 5.82–5.83, 7.6
See application file for complete search history.

(56) References Cited

U.S. PATENT DOCUMENTS

| | | | | |
|---|---|---|---|---|
| 2008/0088469 A1* | 4/2008 | Doemens | G09B 21/003 | 340/407.1 |
| 2014/0274205 A1* | 9/2014 | Goszyk | G01S 17/93 | 250/341.8 |
| 2017/0249862 A1* | 8/2017 | Border | G06V 20/63 | |
| 2018/0078444 A1* | 3/2018 | Gamerman | A61H 3/061 | |
| 2019/0275946 A1* | 9/2019 | Hirata | B60R 1/06 | |
| 2019/0307632 A1* | 10/2019 | Yashiro | G06V 10/757 | |
| 2020/0043368 A1* | 2/2020 | Brathwaite | H04W 4/20 | |
| 2020/0109954 A1* | 4/2020 | Li | G01C 21/3852 | |

FOREIGN PATENT DOCUMENTS

JP WO2018025531 A1 5/2019

* cited by examiner

*Primary Examiner* — Daniel Previl
(74) *Attorney, Agent, or Firm* — HAUPTMAN HAM, LLP

(57) ABSTRACT

When it is determined (by a notification determination unit) that there is information on walking to be notified to a visually impaired person, based on information acquired by a camera, a G sensor, and a GPS module that are built in a white cane used by the visually impaired person, an attribute of the information on walking to be notified is obtained (by an attribute setting unit), and a vibration pattern of a vibration generation device built in the white cane is decided (by an information notification state decision unit) based on the attribute. This makes it possible to optimize the information provided to the visually impaired person.

13 Claims, 9 Drawing Sheets

| INFORMATION ATTRIBUTE | URGENCY DEGREE | IMPORTANCE DEGREE |
|---|---|---|
| INFO.1 | LOW | MEDIUM |
| INFO.2 | LOW | HIGH |
| INFO.3 | MEDIUM | MEDIUM |
| ⋮ | ⋮ | ⋮ |
| INFO.N | HIGH | HIGH |

FIG. 10

| | |
|---|---|
| URGENCY DEGREE CORRECTION PARAMETER | HIGH ⟵ URGENCY DEGREE ⟶ LOW<br>SHORT ⟵ AVOIDANCE MARGIN TIME ⟶ LONG |
| AGILITY OF AVOIDANCE ACTIONS | SLOW ⟷ AGILE |
| EASE OF AVOIDANCE IN ENVIRONMENT | MORE RESTRICTION IN MOVING ⟷ LESS RESTRICTION IN MOVING |
| TARGET RISK CHARACTERISTICS | PERSON ⟷ OBJECT |

WALKING INFORMATION PROVISION SYSTEM

CROSS-REFERENCE TO RELATED APPLICATION

This application claims priority to Japanese Patent Application No. 2021-140635 filed on Aug. 31, 2021, incorporated herein by reference in its entirety.

BACKGROUND

1. Technical Field

The present disclosure relates to a walking information provision system for providing information on walking to a pedestrian. In particular, the present disclosure relates to improvements for optimizing the information provided to the pedestrian.

2. Description of Related Art

Re-publication of PCT International Publication No. 2018-025531 (WO 2018-025531) discloses a system for supporting walking of a pedestrian by a device carried by the pedestrian. Specifically, the configuration described in WO 2018-025531 includes a direction decision unit that decides the direction in which a person who acts without using vision (a visually impaired person) walks and a guide information generation unit that generates guide information for guiding the visually impaired person to walk in the decided direction. The walking direction of the visually impaired person is decided by matching an image from a camera carried by the visually impaired person and a reference image stored in advance to guide the visually impaired person with the walking direction by voice or the like.

SUMMARY

In this kind of system, it is required to grasp the walking situation of the pedestrian and appropriately provide information on walking so that the pedestrian can easily understand the information. For example, when providing information on walking to a visually impaired person by vibrating a white cane held by the visually impaired person, it is required to recognize an urgency degree until the visually impaired person encounters a risk in walking (for example, until the visually impaired person comes into contact with an obstacle) and the degree of influence (importance degree) on walking when the visually impaired person has encountered the risk, and to vibrate the white cane with a vibration pattern suitable for the urgency degree and the importance degree. It is also required that the visually impaired person can easily understand the urgency degree (such as the time until the visually impaired person encounters the risk in walking) and the importance degree (such as the degree of influence on walking when the visually impaired person has encountered the risk) from the vibration. It should be noted that these requirements are not limited to the case where the visually impaired person is provided with information on walking by vibrating the white cane held by the visually impaired person.

The inventors of the present disclosure have considered a walking information provision system capable of providing information on walking to a pedestrian so that the pedestrian can easily understand the information.

The present disclosure has been made in view of this point, and an object of the present disclosure is to realize a walking information provision system capable of optimizing information provided to a pedestrian.

A solution of the present disclosure for achieving the above object is premised on a walking information provision system for providing information on walking to a pedestrian. The walking information provision system includes: an information acquisition unit that is able to acquire at least information of a surrounding situation of the pedestrian; a notification determination unit that determines, based on the information acquired by the information acquisition unit, whether there is information on walking to be notified to the pedestrian; an attribute setting unit that obtains an attribute of the information on walking to be notified when the notification determination unit determines that there is the information on walking to be notified to the pedestrian; and an information notification state decision unit that decides, based on the attribute of the information on walking to be notified that has been obtained by the attribute setting unit, a notification state of the information on walking to be notified to the pedestrian.

Due to this specific matter, when the pedestrian is walking, at least information on the surrounding situation of the pedestrian is acquired by the information acquisition unit. For example, information such as the presence or absence of an obstacle or the like ahead of a pedestrian is acquired. When the notification determination unit determines that there is the information on walking to be notified to the pedestrian based on the acquired information, the attribute setting unit obtains the attribute of the information on walking to be notified. Based on the attribute obtained in this way, the information notification state decision unit decides the notification state of the information on walking to be notified to the pedestrian. The notification state referred to here is a state of notification assigned to each of a plurality of attributes, and examples of the notification state include a pattern of vibration when applied to a device carried by a pedestrian which vibrates to notify information, for example.

In this way, by deciding the notification state based on the attribute of the information on walking to be notified to the pedestrian and providing the information on walking to the pedestrian, the information provided to the pedestrian can be optimized.

The attribute of the information on walking to be notified is obtained in accordance with an urgency degree that is a degree based on a physical time until the pedestrian encounters a risk in walking.

Accordingly, a pedestrian who is notified of the information on walking can easily grasp the physical time until encountering the risk in walking (for example, the time until the pedestrian comes into contact with an obstacle), so that he/she can appropriately perform avoidance actions and preparatory actions (such as stance actions) for encountering the risk.

In this case, the urgency degree may be obtained by correcting, in accordance with an urgency degree correction parameter during walking of the pedestrian, a reference urgency degree corresponding to the physical time until the pedestrian encounters the risk in walking.

This makes it possible to appropriately obtain the urgency degree in accordance with various situations while the pedestrian is walking (state of the pedestrian, surrounding environment, etc.), and the information provided to the pedestrian can be further optimized.

Specifically, the urgency degree correction parameter is at least one of agility of the pedestrian in taking an avoidance action for encountering the risk in walking, ease of taking the avoidance action by the pedestrian due to a surrounding environment for encountering the risk in walking, and a kind of the risk in walking.

Even if the physical time until a pedestrian encounters a risk in walking (the physical time that defines the reference urgency degree) is the same, a pedestrian who is not agile in taking avoidance actions for encountering the risk is more likely to encounter the risk than a pedestrian who is agile in taking avoidance actions. Therefore, in the case of a pedestrian who is not agile in taking avoidance actions, it is preferable to set a higher urgency degree even if the above physical time is the same. In addition, a pedestrian is more likely to encounter a risk in a surrounding environment where it is difficult to take avoidance actions for encountering the risk than in a surrounding environment where the avoidance actions can be easily taken. It is thus preferable to set a higher urgency degree in the case of the surrounding environment where it is difficult to take avoidance actions. The range in which the approach is unacceptable varies depending on the kind of risk to be encountered by a pedestrian. For example, the range in which the approach is unacceptable is assumed to be wider when a pedestrian approaches a person than when the pedestrian approaches an object. In other words, if the risk to be encountered is an object, it is only necessary to consider the physical time until the encounter, but if the risk to be encountered is a person, it is necessary to consider a margin time (psychological margin time) for securing a psychological personal space in addition to the physical time until the encounter. It is thus preferable to set a higher urgency degree in this case as well.

In consideration of the above, in the present solution, the urgency degree is decided by correcting the reference urgency degree (urgency degree corresponding to the physical time until the pedestrian encounters the risk), based on at least one of the agility of the pedestrian in taking avoidance actions for encountering the risk in walking, the ease of taking avoidance actions by the pedestrian due to the surrounding environment for encountering the risk in walking, and the kind of the risk in walking. This makes it possible to further optimize the information provided to the pedestrian.

The attribute of the information on walking to be notified is obtained in accordance with an importance degree that is a degree of influence brought about by a result when the pedestrian has encountered the risk in walking.

Accordingly, a pedestrian who is notified of the information on walking can easily grasp the degree of influence assuming that he/she has encountered a risk in walking (for example, the degree of influence in hindering walking), so that he/she can appropriately recognize the need to perform avoidance actions and preparatory actions for encountering the risk.

The information notification state decision unit is configured to decide a vibration physical characteristic of a device carried by the pedestrian.

This makes it possible to accurately provide the information on walking to a pedestrian based on the type of vibration physical characteristics (vibration pattern) of the device.

As the vibration physical characteristic of the device, when a vibration ON period and a vibration OFF period are repeated, the information notification state decision unit decides, based on the attribute of the information, at least one of a sum of one vibration ON period and one vibration OFF period, and a ratio of the one vibration ON period with respect to the sum of the one vibration ON period and the one vibration OFF period.

Accordingly, the notification state of the information on walking can be clearly differentiated, and the pedestrian can accurately recognize the information on walking.

The device is a white cane used by a visually impaired person serving as the pedestrian, and is configured to notify the visually impaired person using the white cane of the information on walking by vibration.

This makes it possible to optimize the information provided to the visually impaired person who walks while holding the white cane.

In the present disclosure, when it is determined that there is the information on walking to be notified to the pedestrian based on the information acquired by the information acquisition unit, the attribute of the information on walking to be notified is obtained, and the notification state of the information on walking to be notified to the pedestrian is decided based on the attribute. This makes it possible to optimize the information provided to the pedestrian.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 10 is a diagram showing an urgency degree correction table in the modification.

DETAILED DESCRIPTION OF EMBODIMENTS

Hereinafter, an embodiment of the present disclosure will be described with reference to the drawings. The present embodiment describes a case where a walking information provision system according to the present disclosure is built in a white cane used by a visually impaired person. A pedestrian in the present disclosure is not limited to a visually impaired person.

Schematic Configuration of White Cane

Figure 1:
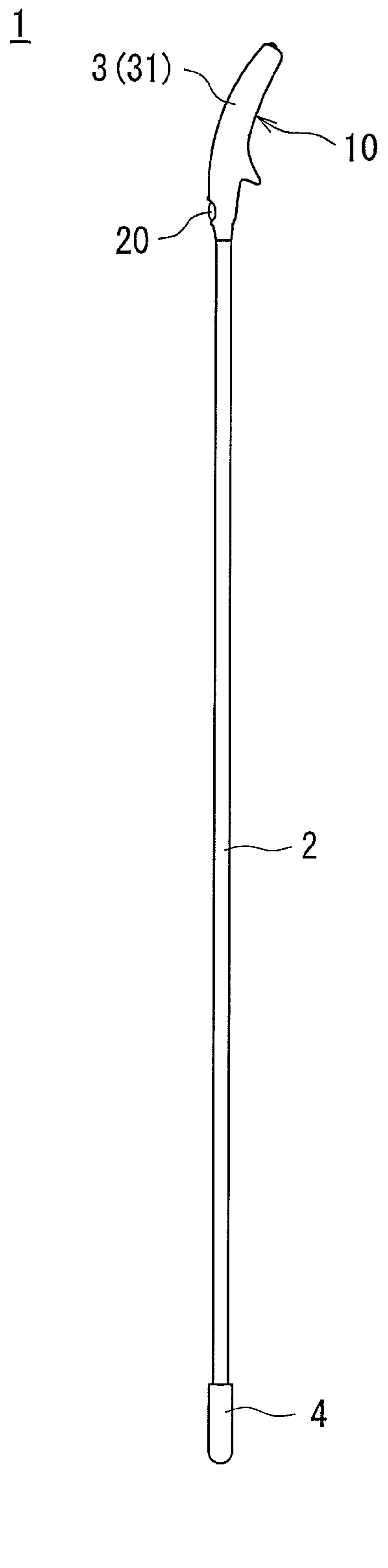
FIG. 1 is a diagram showing a white cane equipped with a walking information provision system according to an embodiment.

FIG. 1 is a diagram showing a white cane 1 equipped with a walking information provision system 10 according to the present embodiment. As shown in FIG. 1, the white cane 1 includes a shaft portion 2, a grip portion 3, and a tip portion (ferrule) 4.

The shaft portion 2 is rod-shaped with a hollow substantially circular section, and is made of aluminum alloy, glass-fiber reinforced resin, carbon fiber reinforced resin, or the like.

The grip portion 3 is provided on a base end portion (upper end portion) of the shaft portion 2 and is configured by mounting a cover 31 made of an elastic body such as rubber. The grip portion 3 of the white cane 1 according to the present embodiment is slightly curved on the tip side (upper side in FIG. 1) in consideration of gripping ease and slipperiness when the visually impaired person (pedestrian) holds the grip portion 3. The configuration of the grip portion 3 is not limited to this.

The tip portion 4 is a substantially bottomed cylindrical member made of hard synthetic resin or the like, and is fitted onto the tip end portion of the shaft portion 2 and fixed to the shaft portion 2 by means such as adhesion or screwing. An end surface of the tip portion 4 on the tip end side has a hemispherical shape.

The white cane 1 according to the present embodiment is a straight cane that cannot be folded. However, the white cane 1 may be a cane that is foldable or expandable/contractable at an intermediate location or at a plurality of locations of the shaft portion 2.

Configuration of Walking Information Provision System

A feature of the present embodiment is the walking information provision system 10 built in the white cane 1. Hereinafter, the walking information provision system 10 will be described.

Figure 2:
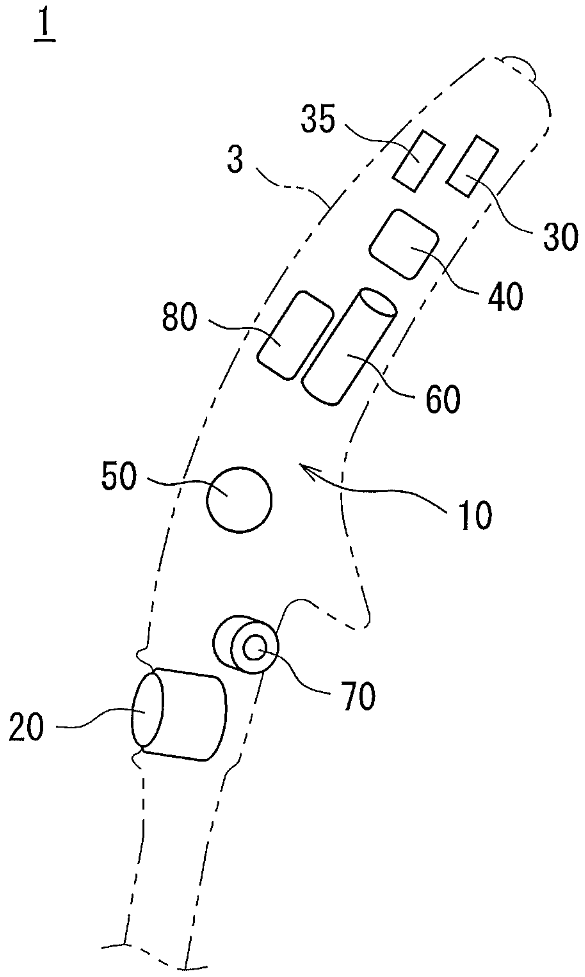
FIG. 2 is a schematic diagram showing the inside of a grip portion of the white cane.
Figure 3:
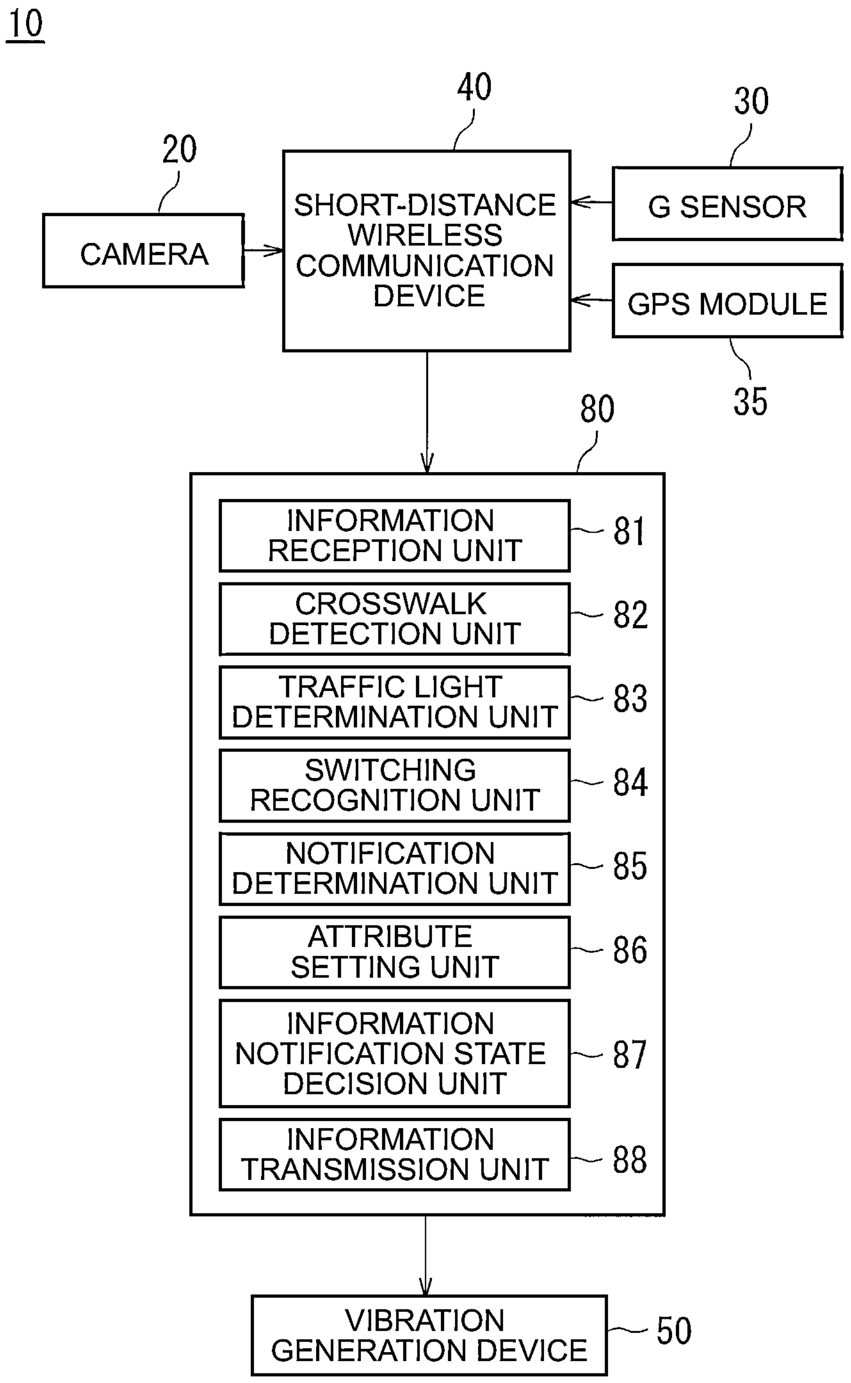
FIG. 3 is a block diagram showing a schematic configuration of a control system of the walking information provision system.

FIG. 2 is a schematic diagram showing the inside of the grip portion 3 of the white cane 1. As shown in FIG. 2, the walking information provision system 10 according to the present embodiment is built in the white cane 1. FIG. 3 is a block diagram showing a schematic configuration of a control system of the walking information provision system 10.

As shown in these figures, the walking information provision system 10 includes a camera 20, a G sensor 30, a global positioning system (GPS) module 35, a short-distance wireless communication device 40, a vibration generation device 50, a battery 60, a charging socket 70, a control device 80, and the like.

The camera 20 is embedded in a front surface (a surface facing the traveling direction of the visually impaired person) of the grip portion 3 on a root portion of the grip portion 3 and captures an image of the front in the traveling direction (front in the walking direction) of the visually impaired person. The camera 20 is configured by, for example, a charge coupled device (CCD) or a complementary metal oxide semiconductor (CMOS). The configuration and the arrangement position of the camera 20 are not limited to those described above, and the camera 20 may be embedded in the front surface (a surface facing the traveling direction of the visually impaired person) of the shaft portion 2, for example.

As a feature of the camera 20, the camera 20 is configured as a wide-angle camera capable of acquiring an image of the front in the traveling direction of the walking visually impaired person, the image including both a white line closest to the visually impaired person of the white lines of the crosswalk and the traffic light located in front of the visually impaired person (for example, a pedestrian traffic light) when the visually impaired person reaches the crosswalk. That is, the camera 20 is configured to be capable of capturing an image of both the frontmost white line of the crosswalk near the feet of the visually impaired person (at a position slightly ahead of the feet) at the time when the visually impaired person has reached a position before the crosswalk, and the traffic light installed on a point at the crossing destination.

The G sensor 30 is built in the grip portion 3 and detects the acceleration generated when the visually impaired person walks. This makes it possible to detect the walking direction and the walking speed of the visually impaired person.

The GPS module 35 receives GPS signals transmitted from three or more (preferably four or more) satellites in the sky, and measures the position of the white cane 1 (position of the visually impaired person).

The short-distance wireless communication device 40 is a wireless communication device for performing short-distance wireless communication between the camera 20, the G sensor 30, the GPS module 35, and the control device 80. For example, the short-distance wireless communication device 40 is configured to perform short-distance wireless communication between the camera 20, the G sensor 30, the GPS module 35, and the control device 80 by known communication means such as Bluetooth (registered trademark) to wirelessly transmit information of the image captured by the camera 20, information of the acceleration generated when the visually impaired person walks, and the information of the position of the visually impaired person to the control device 80.

The vibration generation device 50 is arranged above the camera 20 in the root portion of the grip portion 3. The vibration generation device 50 vibrates in response to the operation of a built-in motor and transmits the vibration to the grip portion 3, so that various notifications can be performed toward the visually impaired person holding the grip portion 3. Specific examples of the notifications performed to the visually impaired person through the vibration of the vibration generation device 50 will be described later.

The battery 60 is configured by a secondary battery that stores electric power for the camera 20, the G sensor 30, the GPS module 35, the short-distance wireless communication device 40, the vibration generation device 50, and the control device 80.

The charging socket 70 is a part where a charging cable is connected when storing electric power in the battery 60. For example, the charging cable is connected when the visually impaired person charges the battery 60 from a household power source at home.

The control device 80 includes, for example, a processor such as a central processing unit (CPU), a read only memory (ROM) that stores a control program, a random access memory (RAM) that stores data temporarily, an input/output port, and the like.

The control device 80 includes, as functional units realized by the control program, an information reception unit 81, a crosswalk detection unit 82, a traffic light determination unit 83, a switching recognition unit 84, a notification determination unit 85, an attribute setting unit 86, an information notification state decision unit 87, and an information transmission unit 88. An outline of the functions of each of the above units will be described below.

The information reception unit 81 receives the information of the image captured by the camera 20, the information of the acceleration from the G sensor 30, and the information of the position of the visually impaired person from the GPS module 35 via the short-distance wireless communication device 40 at a predetermined time interval. Since various types of information are transmitted to the information reception unit 81 in this way, the camera 20, the G sensor 30, and the GPS module 35 constitute the information acquisition unit according to the present disclosure.

The crosswalk detection unit 82 recognizes the crosswalk in the image from the information of the image received by the information reception unit 81 (information of the image captured by the camera 20) and detects the position of each white line of the crosswalk. In particular, the crosswalk detection unit 82 detects the edge position (frontmost position) of the white lines of the crosswalk that is closest to the pedestrian. Recognition of the crosswalk and detection of the edge position of the white line closest to the pedestrian are performed by well-known image matching processing, deep learning, and the like.

The traffic light determination unit 83 determines whether the state of the traffic light (for example, a pedestrian traffic light) is either a red light (stop instruction state) or a green light (crossing permission state) from the information of the image received by the information reception unit 81. In estimating the existing area of the traffic light on the image received by the information reception unit 81, in consideration of the installation position of a general traffic light, a square-shaped traffic light existence area above the crosswalk recognized on the image is set as a cropped range and the existence of the traffic light within the cropped range is estimated. A general object detection algorithm, a general rule-based algorithm, or the like is used for determining the state of the traffic light (detecting the color of the traffic light) performed by the traffic light determination unit 83.

The switching recognition unit 84 recognizes that the state of the traffic light determined by the traffic light determination unit 83 has switched from the red light to the green light. Upon recognizing this switching of the traffic light, the switching recognition unit 84 transmits a switching signal to the information transmission unit 88. The switching signal is transmitted from the information transmission unit 88 to the vibration generation device 50. In conjunction with receiving the switching signal, the vibration generation device 50 vibrates in a predetermined pattern, thereby performing a notification for permitting crossing of the crosswalk (crossing start notification) to the visually impaired person due to the fact that the traffic light has switched from the red light to the green light.

The notification determination unit 85 determines whether there is information on walking to be notified to the visually impaired person based on the information received by the information reception unit 81 (the information of the image captured by the camera 20, the information of the acceleration from the G sensor 30, and the information of the position of the visually impaired person from the GPS module 35).

Examples of the information on walking to be notified to the visually impaired person include information that the visually impaired person has approached the crosswalk, information that the traffic light has switched from a red light to a green light, information that the crossing of the crosswalk has been completed, information that an obstacle that hinders walking is approaching, information that walking must be stopped immediately, information that there is a possibility of deviating to the left side or the right side of the crosswalk while crossing the crosswalk, and the like. The information on walking to be notified to the visually impaired person is not limited to these.

Recognition of the existence of the crosswalk, recognition that the crossing of the crosswalk has been completed, and recognition that there is a possibility of deviating to the left side or the right side of the crosswalk while crossing the crosswalk are performed based on the information of the image captured by the camera 20. The above recognitions may be performed by referring to the information of the position of the visually impaired person from the GPS module 35 and the map information stored in advance. As described above, the traffic light is recognized by the traffic light determination unit 83 and the switching recognition unit 84 based on the information of the image captured by the camera 20. The recognition that an obstacle that hinders walking is approaching is performed based on the information of the image captured by the camera 20. When the obstacle is a fixed object (an object that does not move), the recognition that the obstacle is relatively approaching may be performed by referring to the information of the position of the visually impaired person from the GPS module 35 and the map information stored in advance.

When the notification determination unit 85 determines that there is such information on walking to be notified to the visually impaired person, the notification determination unit 85 outputs the information to the attribute setting unit 86.

When the attribute setting unit 86 receives information from the notification determination unit 85 that there is the information on walking to be notified to the visually impaired person, the attribute setting unit 86 obtains the attribute of the information on walking to be notified. The attribute of the information is decided in accordance with the urgency degree and the importance degree of the risk in walking of the visually impaired person. Here, the urgency degree is a degree based on the physical time until the visually impaired person who is walking encounters the risk. Encountering the risk here means a situation where the visually impaired person who is walking comes into contact with an obstacle (for example, a situation where the visually impaired person comes into contact with an automobile) or a situation where the walking state of the visually impaired person is dangerous (for example, a situation where the visually impaired person enters the road in an attempt to cross the crosswalk while the traffic light is a red light, etc.). In other words, the urgency degree increases as the physical time until the visually impaired person who is walking encounters a risk (risk in walking) becomes shorter. That is, the urgency degree can be obtained as the reciprocal of the margin time for avoiding the risk when encountering the risk. The following mainly describes the situation where the visually impaired person comes into contact with an obstacle as an example of encountering a risk. For example, when a visually impaired person who is walking approaches an obstacle, the urgency degree increases as the distance to the obstacle becomes shorter (as the time to come into contact with the obstacle becomes shorter). In obtaining the urgency degree, the physical time to encounter the risk is calculated by the distance to the risk and the walking speed of the visually impaired person. The distance to the risk is calculated based on the information of the image captured by the camera 20. The walking speed of the visually impaired person is calculated based on the information from the G sensor 30.

The importance degree is the degree of influence brought about by the result when the visually impaired person who is walking has encountered the risk (risk in walking). In other words, the importance degree increases as the size of the object serving as the risk encountered by the visually impaired person who is walking is larger, as the surface of the object is harder, and as the relative speed of approaching the object is higher. For example, when the visually impaired person who is walking approaches an automobile (or when an automobile approaches the visually impaired person), the importance degree is higher than when the visually impaired person approaches a person.

Figures 4, 5:
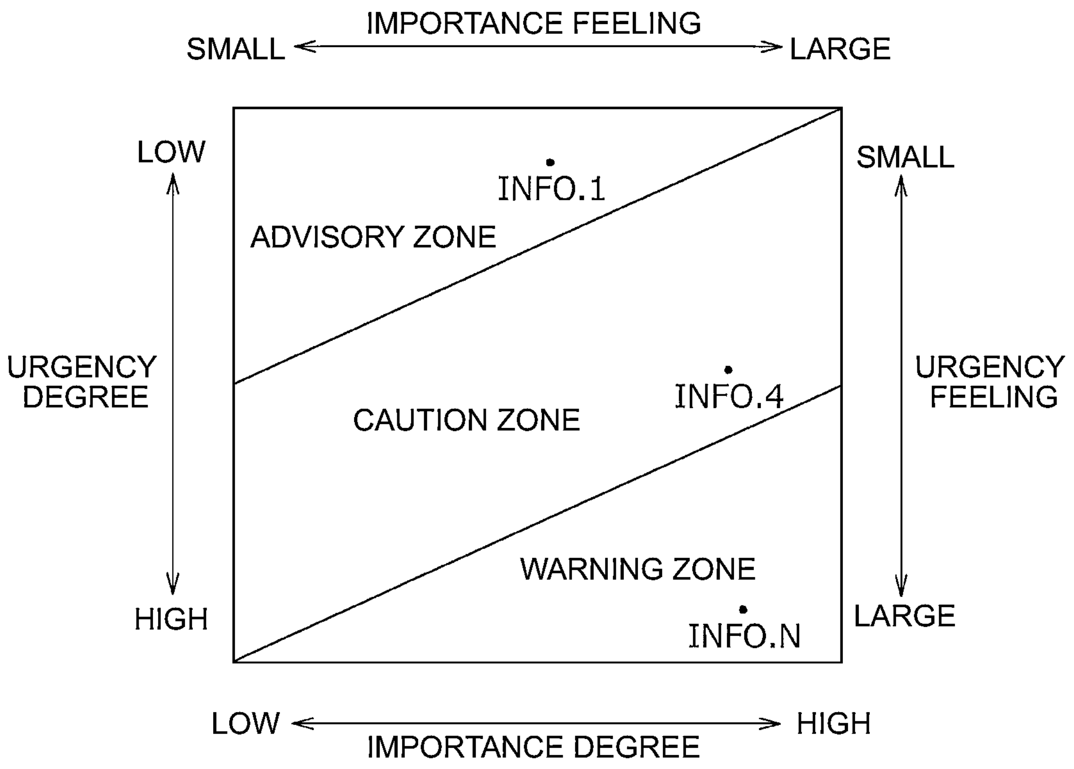
FIG. 4 is a diagram showing an information attribute table.
FIG. 5 is a diagram showing the relationship between an urgency degree and an importance degree, an urgency feeling and an importance feeling, and information attribute zones.

FIG. 4 is a diagram showing an information attribute table. The information attribute table is stored in advance in the ROM of the control device 80. As shown in FIG. 4, in the present embodiment, information attributes (INFO. 1 to INFO. N) are set in accordance with the urgency degree and the importance degree of the risk in walking of a visually impaired person. The urgency degree is classified into three patterns of "low", "medium", and "high", and the importance degree is classified into two patterns of "medium" and "high". A plurality of (for example, six) information attributes (INFO. 1 to INFO. N) are assigned depending on the urgency degree and the importance degree.

As for the urgency degree, when the visually impaired person who is walking approaches an automobile, a wall, or the like, the urgency degree increases as the time until a collision occurs is shorter. In other words, as the time until the collision occurs is shorter, the urgency degree transitions in the order of "low", "medium", and "high" over time. As an example, when the time until the collision occurs is 10 seconds to 6 seconds, the urgency degree is set to "low", when the time until the collision occurs is 6 seconds to 3 seconds, the urgency degree is set to "medium", and when the time until the collision occurs is less than 3 seconds, the urgency degree is set to "high". These values are not limited to the above and can be set to any value.

Even if the time until the collision occurs is the same, the urgency degree differs depending on the characteristics of the visually impaired person himself/herself. For example, the urgency degree is set lower for the visually impaired person who has high agility to avoid contact with the obstacle at the time he/she recognizes the possibility of contact with the obstacle, whereas the urgency degree is set higher for the visually impaired person who has low agility to avoid contact with the obstacle (such as the elderly). For example, in the case of a visually impaired person who has high agility to avoid contact, as the time until the collision occurs becomes shorter, the urgency degree transitions in the order of "low", "medium", and "high" over time (for example, as described above, when the time until the collision occurs is 10 seconds to 6 seconds, the urgency degree is set to "low", when the time until the collision occurs is 6 seconds to 3 seconds, the urgency degree is set to "medium", and when the time until the collision occurs is less than 3 seconds, the urgency degree is set to "high"). However, even in the same situation, in the case of a visually impaired person who has low agility to avoid contact, as the time until the collision occurs becomes shorter, the urgency degree transitions in the order of "medium" and "high" over time (a state where the urgency degree is "low" does not exist). As an example of this case, when the time until the collision occurs is 10 seconds to 5 seconds, the urgency degree is set to "medium", and when the time until the collision occurs is less than 5 seconds, the urgency degree is set to "high". These values are also not limited to the above and can be set to any value. When the urgency degree is to transition in the order of "low", "medium", and "high" even in the case of a visually impaired person who has low agility to avoid contact, the timing of setting the urgency degree to "low", the timing of switching from "low" to "medium", and the timing of switching from "medium" to "high" are each set to be earlier than those of a visually impaired person who has high agility to avoid contact. For example, when the time until the collision occurs is 15 seconds to 10 seconds, the urgency degree is set to "low", and when the time until the collision occurs is 10 seconds to 5 seconds, the urgency degree is set to "medium", and when the time until the collision occurs is less than 5 seconds, the urgency degree is set to "high". These values are also not limited to the above and can be set to any value.

The importance degree is an index of the degree of influence on walking when a visually impaired person comes into contact with an object. For example, when a visually impaired person approaches an obstacle such as an automobile or a wall, the degree of influence on walking when he/she comes into contact is high, so the importance degree is high. On the other hand, when a visually impaired person approaches another person, the degree of influence on walking when he/she comes into contact is relatively small (smaller than when coming into contact with an automobile or a wall), so the importance degree is medium. The recognition of the object is performed by well-known image matching processing, deep learning, and the like.

The urgency degree and the importance degree described above are set (preset) in advance by the designer of the walking information provision system 10 or the setter of each information before use of the white cane 1. That is, the relationship between the physical time until the visually impaired person encounters the risk and the urgency degree, the relationship between the agility of the visually impaired person using the white cane 1 in taking actions to avoid encountering the risk and the urgency degree, and the relationship between the risk in walking and the importance degree are each information preset in the walking information provision system 10.

FIG. 5 is a diagram showing the relationship between the urgency degree and the importance degree described above, the urgency feeling and the importance feeling, and information attribute zones. The urgency feeling represents a person's psychological sensation corresponding to the urgency degree (corresponding to the magnitude of the sense of danger for coming into contact with an obstacle or the like). The importance feeling represents a person's psychological sensation corresponding to the importance degree (corresponding to the magnitude of the sense of fear assuming that the person has come into contact with an obstacle or the like). As is clear from FIG. 5, the higher the urgency degree is, the larger the urgency feeling is, and the higher the importance degree is, the larger the importance feeling is. Therefore, in the present embodiment, as the assigned areas (information attribute zones) of the information attributes (INFO. 1 to INFO. N), the area where both the urgency feeling and the importance feeling are relatively small is defined as the advisory zone, the area where both the urgency feeling and the importance feeling are relatively large is defined as the warning zone, and other areas (areas where both the urgency feeling and the importance feeling are at intermediate levels) are defined as the caution zone. The information attributes (INFO. 1 to INFO. N) are assigned to each zone. In the example shown in FIG. 5, the information attribute INFO. 1 (with a small urgency feeling and a medium importance feeling) is assigned to the advisory zone, the information attribute INFO. 4 (with a medium urgency feeling and a large importance feeling) is assigned to the caution zone, and the information attribute INFO. N (with a large urgency feeling and a large importance feeling) is assigned to the warning zone.

In the above description, the urgency degree is made to differ depending on the characteristics of the visually impaired person himself/herself, but the urgency degree may simply be decided only by the physical time until the visually impaired person encounters the risk without considering the characteristics of the visually impaired person himself/herself.

The information notification state decision unit 87 decides the notification state of the information on walking to be notified to the visually impaired person based on the attribute (information attribute) of the information on walking to be notified that has been obtained by the attribute setting unit 86. Specifically, the vibration physical characteristics (vibration pattern) of the vibration generation device 50 are decided in accordance with the information attributes.

Figure 6:
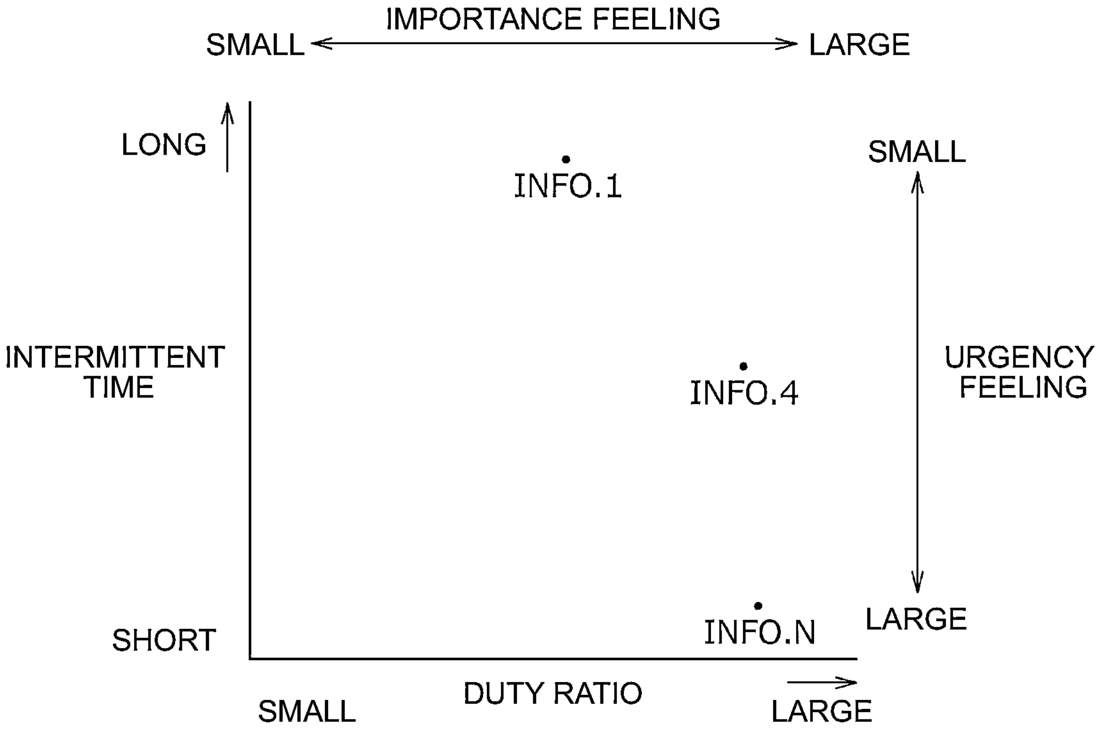
FIG. 6 is a diagram showing a vibration characteristic decision map.

FIG. 6 is a diagram showing a vibration characteristic decision map that is used when deciding the vibration physical characteristics of the vibration generation device 50. The vibration characteristic decision map is stored in advance in the ROM of the control device 80.

Specifically, as the vibration of the vibration generation device 50, the vibration ON period and the vibration OFF period are repeated. The vibration characteristic decision map is used to decide, as the vibration physical characteristics of the vibration generation device 50, the sum of one vibration ON period and one vibration OFF period, and the ratio of one vibration ON period with respect to the sum of one vibration ON period and one vibration OFF period in accordance with the information attributes (INFO. 1 to INFO. N). In the following description, the sum of one vibration ON period and one vibration OFF period is referred to as the "intermittent time" of the vibration, and the ratio of one vibration ON period with respect to the sum of one vibration ON period and one vibration OFF period is referred to as the "duty ratio" of the vibration.

Figure 7A:
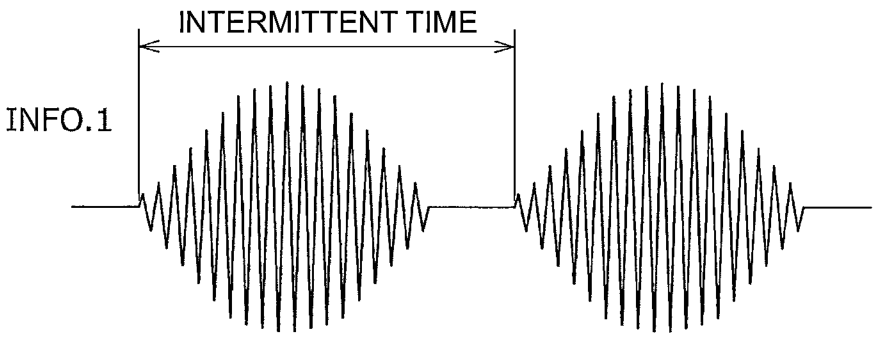
FIG. 7A is a waveform diagram showing an example of a vibration pattern assigned to an information attribute.
Figure 7B:
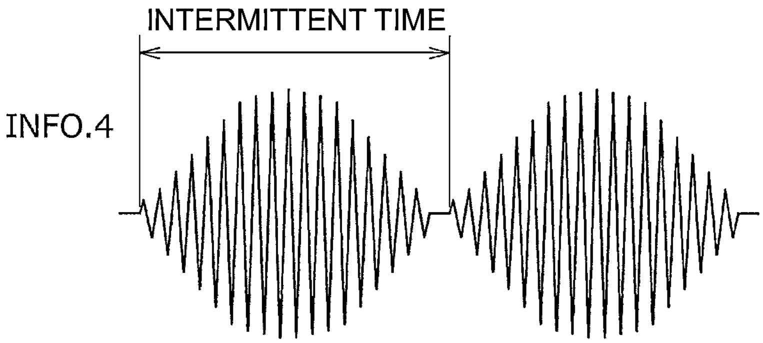
FIG. 7B is a waveform diagram showing an example of a vibration pattern assigned to an information attribute.
Figure 7C:
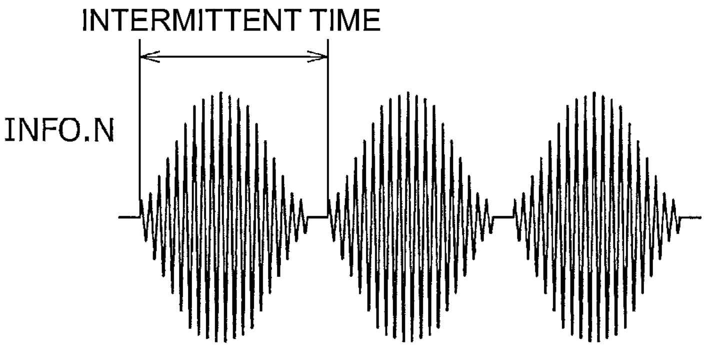
FIG. 7C is a waveform diagram showing an example of a vibration pattern assigned to an information attribute.

As described above as an example, for the information attribute INFO. 1 (information attribute INFO. 1 assigned to the advisory zone with a low urgency degree and a medium importance degree), the intermittent time is set to be relatively long and the duty ratio is set at an intermediate magnitude. FIG. 7A is a waveform diagram showing the vibration pattern of the vibration generation device 50 in this case. For the information attribute INFO. 4 (information attribute INFO. 4 assigned to the caution zone with a medium urgency degree and a high importance degree), the intermittent time is set to an intermediate length and the duty ratio is set to be large. FIG. 7B is a waveform diagram showing the vibration pattern of the vibration generation device 50 in this case. For the information attribute INFO. N (information attribute INFO. N assigned to the warning zone with a high urgency degree and a high importance degree), the intermittent time is set to be short and the duty ratio is set to be large. FIG. 7C is a waveform diagram showing the vibration pattern of the vibration generation device 50 in this case. Here, three types of the information attributes INFO. 1, INFO. 4, and INFO. N has been described. However, the intermittent time and the duty ratio are individually set for each of the other information attributes.

The tendency of the intermittent time and the duty ratio set corresponding to each of these information attributes is set so that the higher the urgency degree is, the shorter the intermittent time is, and the higher the importance degree is, the larger the duty ratio is. This is intended to allow the visually impaired person to easily and intuitively recognize that the notification indicates high urgency by shortening the intermittent time and increasing the number of repetitions of the vibration ON period and the vibration OFF period per unit time in a situation with a high urgency degree (see FIG. 7C). This is also intended to allow the visually impaired person to easily and intuitively recognize that the notification indicates a large influence (large damage) when coming into contact with an object by making the vibration ON period significantly longer than the vibration OFF period in a situation with a high importance degree (see FIG. 7B).

In this way, when it is determined that there is the information on walking to be notified to the visually impaired person based on the information acquired by the camera 20 or the like, the attribute (information attribute) of the information on walking to be notified is obtained, and the notification state (vibration pattern of the vibration generation device 50) of the information on walking to be notified to the visually impaired person is decided based on the attribute. This makes it possible to optimize the information provided to the visually impaired person.

Figure 8:
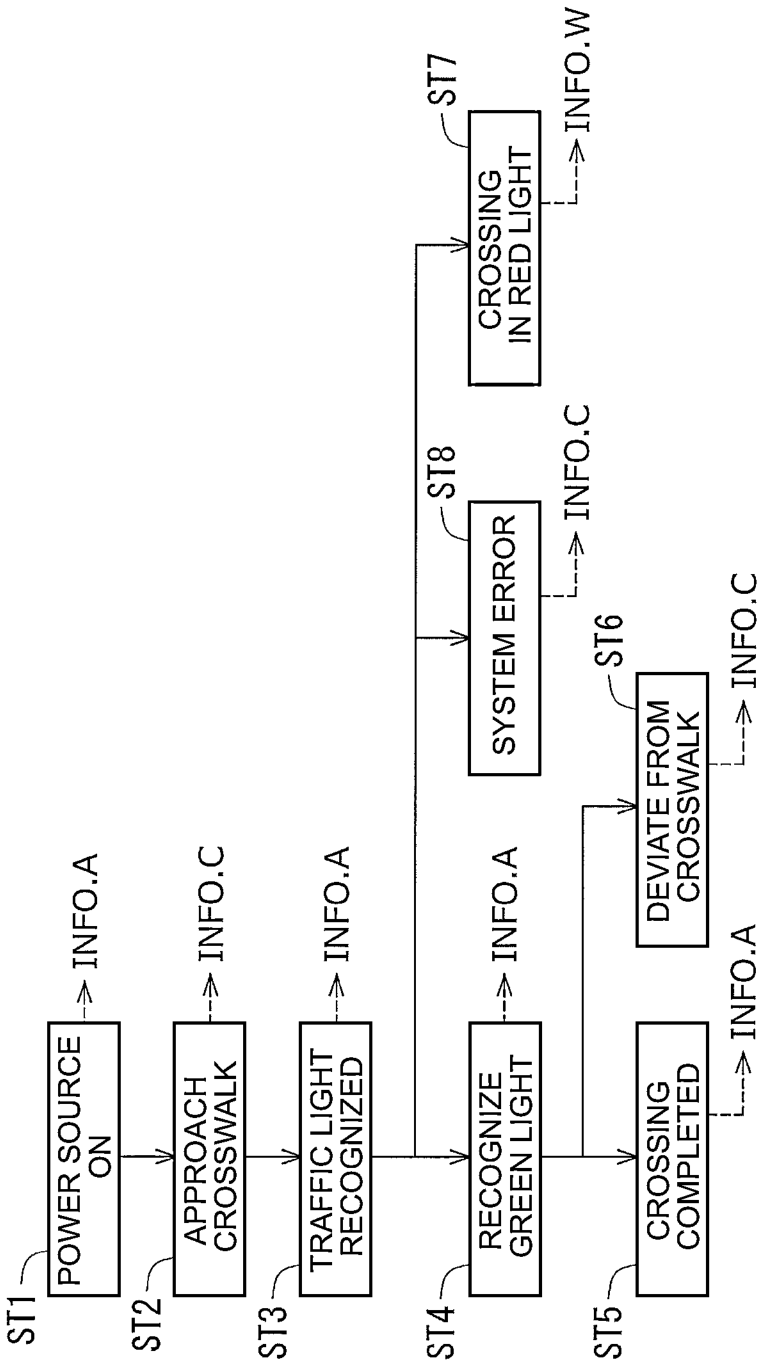
FIG. 8 is a diagram illustrating information attribute zones corresponding to information attributes at each timing when a pedestrian crosses a crosswalk with a traffic light.

Hereinafter, an actual usage example of the walking information provision system 10 will be described. FIG. 8 is a diagram illustrating an information attribute zone corresponding to an information attribute at each timing when a visually impaired person holding the white cane 1 equipped with the walking information provision system 10 crosses a crosswalk with a traffic light. The information attribute INFO. A (Advisory) in FIG. 8 is an information attribute assigned to the advisory zone, and includes the information attribute INFO. 1 with a low urgency degree and a medium importance degree and the information attribute INFO. 2 with a low urgency degree and a high importance degree. That is, in the case of the information attribute INFO. A, the information attribute INFO. 1 or the information attribute INFO. 2 is selected depending on the situation, and the vibration generation device 50 vibrates at the intermittent time and the duty ratio extracted by the vibration characteristic decision map shown in FIG. 6 in accordance with the selected information attribute. The information attribute INFO. C (Caution) in FIG. 8 is an information attribute assigned to the caution zone, and includes the information attribute INFO. 3 with a medium urgency degree and a medium importance degree and the information attribute INFO. 4 with a medium urgency degree and a high importance degree. That is, in the case of the information attribute INFO. C, the information attribute INFO. 3 or the information attribute INFO. 4 is selected depending on the situation, and the vibration generation device 50 vibrates at the intermittent time and the duty ratio extracted by the vibration characteristic decision map in accordance with the selected information attribute. The information attribute INFO. W (Warning) in FIG. 8 is an information attribute assigned to the warning zone, and includes the information attribute INFO. 5 with a high urgency degree and a medium importance degree and the information attribute INFO. 6 (INFO. N described above) with a high urgency degree and a high importance degree. That is, in the case of the information attribute INFO. W, the information attribute INFO. 5 or the information attribute INFO. 6 is selected depending on the situation, and the vibration generation device 50 vibrates at the intermittent time and the duty ratio extracted by the vibration characteristic decision map in accordance with the selected information attribute.

Specifically, as a situation in which a visually impaired person crosses a crosswalk, first, in a state in which the visually impaired person has not approached the crosswalk and the power source of the walking information provision system 10 is turned on (state of ST1), the information attribute INFO. A is set.

When the visually impaired person starts walking and has approached the crosswalk (the time to reach the crosswalk is less than a predetermined time) (state of ST2), the information attribute INFO. C is set to caution the visually impaired person. While the visually impaired person is stopped in front of the crosswalk due to the vibration of the vibration generation device 50 in accordance with the information attribute INFO. C, when the state transitions to the state where the state of the traffic light is recognized based on the information of the image captured by the camera 20 (state of ST3), the information attribute returns to the information attribute INFO. A.

When it is recognized that the traffic light has switched from a red light to a green light (state of ST4), a notification is given to allow crossing of the crosswalk. In this case as well, the information attribute INFO. A is maintained.

When the visually impaired person completes the crossing of the crosswalk without deviating to the left side or the right side of the crosswalk (state of ST5), the information attribute INFO. A is maintained.

However, when the visually impaired person deviates to the left side or the right side of the crosswalk while crossing the crosswalk (state of ST6), the information attribute INFO. C is set to caution the visually impaired person. The visually impaired person who has recognized the vibration of the vibration generation device 50 intended to give caution grasps that he/she is in a situation deviating from the crosswalk and changes the walking direction so as to walk in the center of the crosswalk. For example, the visually impaired person changes the walking direction in accordance with the sound from the voice generator for the visually impaired person installed at the intersection.

Further, when the visually impaired person starts crossing the crosswalk while recognizing the state of the traffic light described above (state of ST3) (for example, when the crossing is started even though the traffic light is a red light, that is, in the state of ST7), the information attribute INFO. W is set to warn the visually impaired person (vibration is performed with a vibration pattern that indicates a warning to instruct the stop of the crossing). The visually impaired person who has recognized the vibration of the vibration generation device 50 intended to warn the visually impaired person stops walking immediately.

While recognizing the state of the traffic light (state of ST3), when an error occurs in the walking information provision system 10 (state of ST8) due to a situation in which the state of the traffic light cannot be accurately recognized, the information attribute INFO. C is set to caution the visually impaired person.

With the above operations, the vibration generation device 50 vibrates at the intermittent time and the duty ratio in accordance with the information attribute selected in accordance with the state of the visually impaired person.

The above operations are repeated.

Effect of Embodiment

As described above, in the present embodiment, when it is determined that there is the information on walking to be notified to the visually impaired person based on the information acquired by means such as the camera 20, the G sensor 30, and the GPS module 35, the attribute of the information on walking to be notified is obtained based on the urgency degree and the importance degree, and the notification state (vibration pattern of the vibration generation device 50 of the white cane 1) of the information on walking to be notified to the visually impaired person is decided based on the attribute. This makes it possible to optimize the information provided to the visually impaired person.

In the present embodiment, the attribute of the information on walking to be notified to the visually impaired person is obtained in accordance with the urgency degree. Therefore, a visually impaired person who is notified of the information on walking can easily grasp the physical time until encountering the risk in walking (for example, the time until the visually impaired person comes into contact with an obstacle), so that he/she can appropriately perform avoidance actions and preparatory actions (such as stance actions) for encountering the risk.

In the present embodiment, the attribute of the information on walking to be notified to the visually impaired person is obtained in accordance with the importance degree. Therefore, a visually impaired person who is notified of the information on walking can easily grasp the degree of influence assuming that he/she has encountered a risk in walking (for example, the degree of influence in hindering walking), so that he/she can appropriately recognize the need to perform avoidance actions and preparatory actions for encountering the risk.

Further, in the present embodiment, the intermittent time and the duty ratio of the vibration are decided based on the information attribute as the vibration physical characteristics (vibration pattern) of the vibration generation device 50. Therefore, the notification state of the information on walking can be clearly differentiated, and the visually impaired person can accurately recognize the information on walking.

Modification

Next, a modification will be described. In the present modification, the method for deciding the urgency degree is different from that in the above-described embodiment. Other configurations and operations are the same as in the above-described embodiment. Therefore, the method for deciding the urgency degree will be mainly described here.

Even if the physical time until the visually impaired person encounters the risk in walking is the same, the urgency degree may vary depending on the characteristics of the visually impaired person and the surrounding environment. That is, as described above, a visually impaired person who is not agile in taking avoidance actions for encountering the risk is more likely to encounter the risk than a visually impaired person who is agile in taking avoidance actions. Therefore, in the case of a visually impaired person who is not agile in taking avoidance actions, it is preferable to set a higher urgency degree even if the above physical time is the same. In addition, a visually impaired person is more likely to encounter a risk in a surrounding environment where it is difficult to take avoidance actions for encountering the risk than in a surrounding environment where the avoidance actions can be easily taken. For example, walking on a narrow sidewalk or a narrow roadside zone, or the presence of many other pedestrians can be considered a surrounding environment where it is difficult to take avoidance actions. It is thus preferable to set a higher urgency degree in the case of the surrounding environment where it is difficult to take avoidance actions. The range in which the approach is unacceptable varies depending on the kind of risk to be encountered by a visually impaired person. For example, the range in which the approach is unacceptable is assumed to be wider when a visually impaired person approaches a person than when the visually impaired person approaches an object. In other words, if the risk to be encountered is an object, it is only necessary to consider the physical time until the encounter, but if the risk to be encountered is a person, it is necessary to consider a margin time (psychological margin time) for securing a psychological personal space in addition to the physical time until the encounter. It is thus preferable to set a higher urgency degree in this case as well.

In consideration of the above, in the present modification, based on the agility of the visually impaired person in taking avoidance actions for encountering the risk in walking, the ease of taking avoidance actions by the visually impaired person due to the surrounding environment for encountering the risk in walking, and the kind of the risk in walking, the urgency degree is decided by correcting the urgency degree (reference urgency degree) that is decided only by the physical time until the visually impaired person encounters the risk, and the information attribute (INFO. 1 to INFO. N) is obtained in accordance with the decided urgency degree.

Figure 9:
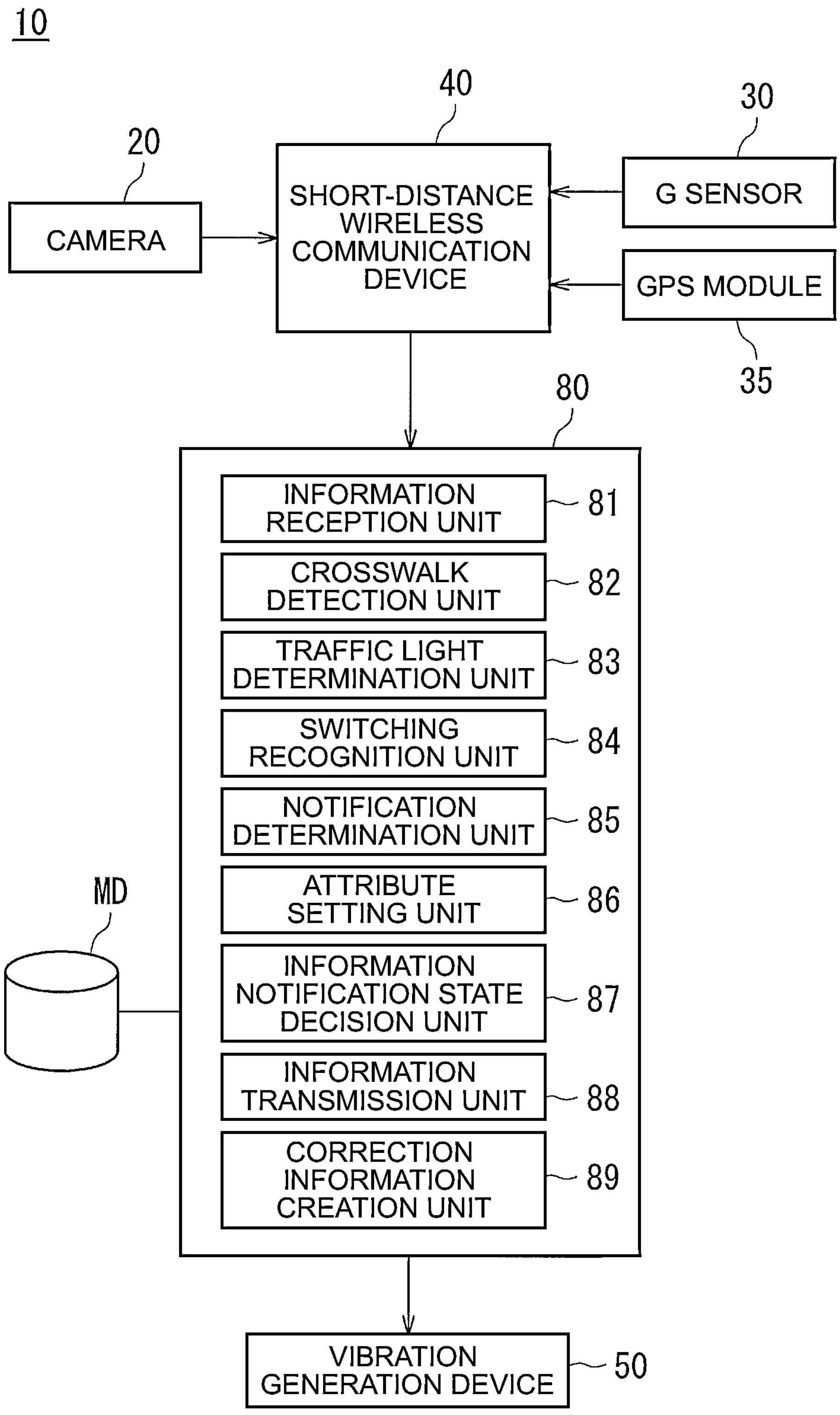
FIG. 9 is a block diagram showing a schematic configuration of a control system of the walking information provision system in a modification.

FIG. 9 is a block diagram showing a schematic configuration of a control system of the walking information provision system 10 in the present modification. As shown in FIG. 9, in the present modification, the control device 80 is provided with a correction information creation unit 89. The correction information creation unit 89 sets the degree of correction to the reference urgency degree based on the agility of the visually impaired person in taking avoidance actions for encountering the risk in walking, the ease of taking avoidance actions by the visually impaired person due to the surrounding environment for encountering the risk in walking, and the kind of the risk in walking described above.

FIG. 10 is a diagram showing an urgency degree correction table that is referred to when the correction information creation unit 89 sets the degree of correction to the reference urgency degree. As shown in FIG. 10, in the urgency degree correction table, items such as "agility of avoidance actions", "ease of avoidance in environment", and "target risk characteristics" are set as the urgency degree correction parameters that are the parameters for the correction.

As the "agility of avoidance actions", the higher the agility of avoidance actions of the visually impaired person for encountering the risk in walking is, the smaller the correction term of the urgency degree is obtained, and the lower the agility of avoidance actions of the visually impaired person for encountering the risk in walking is (the slower the avoidance actions are), the larger the correction term of the urgency degree is obtained. When the correction term is obtained as a value larger than a predetermined value, the reference urgency degree is corrected and the final urgency degree (the urgency degree used for obtaining the information attribute) is decided. That is, when the correction term is obtained as a value larger than a predetermined value, when the reference urgency degree is "low", the urgency degree is corrected to "medium", and when the reference urgency degree is "medium", the urgency degree is corrected to "high". The urgency degree is then applied to the information attribute table shown in FIG. 4.

As the "ease of avoidance in environment", the easier it is to take avoidance actions for encountering the risk in walking (the less restriction there is in moving) in the surrounding environment, the smaller the correction term of the urgency degree is obtained, and the more difficult it is to take avoidance actions for encountering the risk in walking (the more restriction there is in moving) in the surrounding environment, the larger the correction term of the urgency degree is obtained. When the correction term is obtained as a value larger than a predetermined value, the reference urgency degree is corrected and the final urgency degree (the urgency degree used for obtaining the information attribute) is decided. That is, also in this case, when the correction term is obtained as a value larger than a predetermined value, when the reference urgency degree is "low", the urgency degree is corrected to "medium", and when the reference urgency degree is "medium", the urgency degree is corrected to "high". The urgency degree is then applied to the information attribute table shown in FIG. 4.

In the present modification, a map database MD that stores 3D detailed map data as map information is provided, and it is possible to read the 3D detailed map data from the map database MD. The 3D detailed map data includes not only two-dimensional map data but also information such as steps, unevenness, and groove depths of the road surface, and stores information of objects that may hinder walking and that cannot be grasped only by the two-dimensional map data. The "ease of avoidance in environment" is determined from the 3D detailed map data, and the determination result is also incorporated in the correction term of the urgency degree.

As the "target risk characteristics", when the kind of the risk to be encountered by the visually impaired person is an object, a small value is obtained as the correction term, and when the kind of the risk to be encountered by the visually impaired person is a person, a large value is obtained as the correction term. When the correction term is obtained as a value larger than a predetermined value, the reference urgency degree is corrected and the final urgency degree (the urgency degree used for obtaining the information attribute) is decided. That is, also in this case, when the correction term is obtained as a value larger than a predetermined value, when the reference urgency degree is "low", the urgency degree is corrected to "medium", and when the reference urgency degree is "medium", the urgency degree is corrected to "high". The urgency degree is then applied to the information attribute table shown in FIG. 4.

By correcting the reference urgency degree to decide the urgency degree in this way, the information attribute can be obtained in response to changes in conditions that cannot be preset, and the vibration physical characteristics (vibration pattern) of the vibration generation device 50 can be decided in accordance with the information attribute. This makes it possible to further optimize the information provided to the visually impaired person.

Other Embodiments

It should be noted that the present disclosure is not limited to the above-described embodiment or the above-described modification, and all modifications and applications included in the claims and the range equivalent to the claims can be applied.

For example, in the above-described embodiment and the above-described modification, a case where the walking information provision system 10 is built in the white cane 1 used by a visually impaired person has been described. The present disclosure is not limited to this, and the walking information provision system 10 may be built in a cane, a wheel walker, or the like when the pedestrian is an elderly person. Further, a mobile terminal (smartphone), a flashlight, or the like that is carried by a pedestrian may be used.

In the above-described embodiment and the above-described modification, the intermittent time and the duty ratio are changed in accordance with the information attribute as the vibration pattern of the vibration generation device 50, but only one of the intermittent time and the duty ratio may be changed in accordance with the information attribute.

In the above-described embodiment and the above-described modification, the types of the notification are classified in accordance with the vibration pattern of the vibration generation device 50. The present disclosure is not limited to this, and various notifications may be performed by voice. In this case, the visually impaired person may be notified directly by voice (for example, a voice such as "approaching an obstacle" or "red light" may be emitted), or the pitch, the volume, or the output pattern of the voice may be changed depending on the type of notification. In the case of this notification by voice, the white cane 1 may be equipped with a speaker to emit a voice from the speaker, or the visually impaired person may wear an earphone (for example, a wireless earphone that performs wireless communication with the white cane 1) to emit a voice from the earphone.

Further, in the above-described embodiment and the above-described modification, the case where the entire walking information provision system 10 is built in the white cane 1 has been described, but a part of the components of the walking information provision system 10 may be provided in a part other than the white cane 1. For example, all or part of the camera 20, the G sensor 30, and the GPS module 35 may be mounted on glasses worn by the visually impaired person.

Further, in the above-described embodiment and the above-described modification, three zones, namely, the advisory zone, the caution zone, and the warning zone, are provided as the information attribute zones. The present disclosure is not limited to this, and two zones or four or more zones may be provided as the information attribute zones.

Further, in the above-described modification, items such as the "agility of avoidance actions", the "ease of avoidance in environment", and the "target risk characteristics" are set as the urgency degree correction parameters. The present disclosure is not limited to this, and one or two of these may be set as the urgency degree correction parameter(s).

The present disclosure can be applied to a walking information provision system for providing information on walking to a pedestrian.

What is claimed is:

1. A walking information provision system for providing information on walking to a pedestrian, the walking information provision system comprising:

an information acquisition unit configured to acquire at least information of a surrounding situation of the pedestrian;

a notification determination unit configured to determine, based on the at least information acquired by the information acquisition unit, whether there is information on walking to be notified to the pedestrian;

an attribute setting unit configured to, in response to the notification determination unit determining that there is the information on walking to be notified to the pedestrian, obtain an attribute of the information on walking to be notified to the pedestrian according to an urgency degree and an importance degree, wherein the urgency degree is based on a physical time until the pedestrian encounters a risk in walking, and the importance degree is a degree of influence brought about by a result when the pedestrian has encountered the risk in walking; and an information notification state decision unit configured to, based on the attribute of the information on walking to be notified to the pedestrian that has been obtained by the attribute setting unit, decide a notification state of the information on walking to be notified to the pedestrian, decide a vibration physical characteristic of a device carried by the pedestrian, and in response to the notification state including a repetition of a vibration ON period and a vibration OFF period, decide, according to the attribute of the information on walking, at least one of (i) an intermittent time being a sum of the one vibration ON period and the one vibration OFF period, or (ii) a duty ratio being a ratio of the one vibration ON period to the intermittent time, as the vibration physical characteristic of the device, wherein the intermittent time is set to be shorter as the urgency degree of the attribute of the information on walking is higher, and the duty ratio is set to be larger as the importance degree of the attribute of the information on walking is higher.

2. The walking information provision system according to claim 1, wherein the urgency degree is obtained by correcting, in accordance with an urgency degree correction parameter during walking of the pedestrian, a reference urgency degree corresponding to the physical time until the pedestrian encounters the risk in walking.

3. The walking information provision system according to claim 2, wherein the urgency degree correction parameter is at least one of (i) agility of the pedestrian in taking an avoidance action for encountering the risk in walking, (ii) ease of taking the avoidance action by the pedestrian due to a surrounding environment for encountering the risk in walking, or (iii) a kind of the risk in walking.

4. The walking information provision system according to claim 1, wherein the attribute of the information on walking is assigned to an advisory zone in response to a combination of the urgency degree and the importance degree being lower than a first predetermined value, a warning zone in response to the combination of the urgency degree and the importance degree being higher than a second predetermined value greater than the first predetermined value, and a caution zone in response to the combination of the urgency degree and the importance degree being between the first predetermined value and the second predetermined value.

5. The walking information provision system according to claim 4, wherein the information notification state decision unit is configured to, for the attribute of the information on walking assigned to the advisory zone, set the intermittent time to a first length, and the duty ratio to a first magnitude, for the attribute of the information on walking assigned to the caution zone, set the intermittent time to a second length less than the first length, and the duty ratio to a second magnitude greater than the first magnitude, and for the attribute of the information on walking assigned to the warning zone, set the intermittent time to a third length less than the second length, and the duty ratio to the second magnitude.

6. The walking information provision system according to claim 5, wherein the attribute of the information on walking is assigned to the advisory zone in response to any one of following (a)-(d):

(a) the pedestrian being a visually impaired person has not approached a crosswalk and a power source of the walking information provision system is turned on, (b) a state of a traffic light is recognized based on information of an image captured by a camera of the device, (c) the state of the traffic light being switched from a red light to a green light was recognized, and (d) the visually impaired person completes crossing of the crosswalk without deviating to a left side or a right side of the crosswalk.

7. The walking information provision system according to claim 6, wherein the attribute of the information on walking is assigned to the caution zone in response to any one of following (e)-(g):

(e) the visually impaired person starts walking toward the crosswalk and a time to reach the crosswalk is less than a predetermined time, (f) the visually impaired person deviates to the left side or the right side of the crosswalk while crossing the crosswalk, and (g) an error occurs in the walking information provision system due to the state of the traffic light not being recognized.

8. The walking information provision system according to claim 7, wherein the attribute of the information on walking is assigned to the warning zone in response to that the visually impaired person starts crossing the crosswalk even though the traffic light is the red light.

9. The walking information provision system according to claim 8, wherein the urgency degree is obtained by correcting, in accordance with an urgency degree correction parameter during walking of the pedestrian, a reference urgency degree corresponding to the physical time until the pedestrian encounters the risk in walking.

10. The walking information provision system according to claim 9, wherein the urgency degree correction parameter is at least one of (i) agility of the pedestrian in taking an avoidance action for encountering the risk in walking, (ii) ease of taking the avoidance action by the pedestrian due to a surrounding environment for encountering the risk in walking, or (iii) a kind of the risk in walking.

11. The walking information provision system according to claim 1, wherein the device is a cane used by the pedestrian being a visually impaired person, and is configured to notify the visually impaired person of the information on walking by vibration, the attribute of the information on walking is assigned, based on the urgency degree and the importance degree, to an advisory zone, a caution zone, or a warning zone, the attribute of the information on walking is assigned to the advisory zone in response to any one of following (a)-(d):

(a) the visually impaired person has not approached a crosswalk and a power source of the walking information provision system is turned on, (b) a state of a traffic light is recognized based on information of an image captured by a camera of the cane, (c) the state of the traffic light being switched from a red light to a green light was recognized, and (d) the visually impaired person completes crossing of the crosswalk without deviating to a left side or a right side of the crosswalk, the attribute of the information on walking is assigned to the caution zone in response to any one of following (e)-(g):

(e) the visually impaired person starts walking toward the crosswalk and a time to reach the crosswalk is less than a predetermined time, (f) the visually impaired person deviates to the left side or the right side of the crosswalk while crossing the crosswalk, and (g) an error occurs in the walking information provision system due to the state of the traffic light not being recognized, and the attribute of the information on walking is assigned to the warning zone in response to that the visually impaired person starts crossing the crosswalk even though the traffic light is the red light.

12. The walking information provision system according to claim 11, wherein the attribute of the information on walking is assigned to the advisory zone in response to a combination of the urgency degree and the importance degree being lower than a first predetermined value, the warning zone in response to the combination of the urgency degree and the importance degree being higher than a second predetermined value greater than the first predetermined value, and the caution zone in response to the combination of the urgency degree and the importance degree being between the first predetermined value and the second predetermined value.

13. The walking information provision system according to claim 12, wherein the information notification state decision unit is configured to, for the attribute of the information on walking assigned to the advisory zone, set the intermittent time to a first length, and the duty ratio to a first magnitude, for the attribute of the information on walking assigned to the caution zone, set the intermittent time to a second length less than the first length, and the duty ratio to a second magnitude greater than the first magnitude, and for the attribute of the information on walking assigned to the warning zone, set the intermittent time to a third length less than the second length, and the duty ratio to the second magnitude.

* * * * *